US012647534B2

(12) United States Patent
Fedyk et al.

(10) Patent No.: US 12,647,534 B2
(45) Date of Patent: Jun. 2, 2026

(54) VIRTUAL MEETING BACKGROUND FREEZE

(71) Applicant: Google LLC, Mountain View, CA (US)

(72) Inventors: Ryan Fedyk, Brooklyn, NY (US); Ahmed Hassan Aly Hassan, Stockholm (SE); Anton Volkov, Seattle, WA (US); Stéphane Hervé Loïc Hulaud, Stockholm (SE)

(73) Assignee: Google LLC, Mountain View, CA (US)

( * ) Notice: Subject to any disclaimer, the term of this patent is extended or adjusted under 35 U.S.C. 154(b) by 63 days.

(21) Appl. No.: 18/432,803

(22) Filed: Feb. 5, 2024

(65) Prior Publication Data

US 2025/0254269 A1     Aug. 7, 2025

(51) Int. Cl.
| | |
|---|---|
| *H04N 7/15* | (2006.01) |
| *G06T 5/50* | (2006.01) |
| *G06T 7/13* | (2017.01) |
| *G06T 7/73* | (2017.01) |
| *G06T 11/60* | (2026.01) |

(52) U.S. Cl.
CPC .............. *H04N 7/157* (2013.01); *G06T 5/50* (2013.01); *G06T 7/13* (2017.01); *G06T 7/73*
(2017.01); *G06T 11/60* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2017/0193280 A1* | 7/2017 | Huang | ................... G06F 16/784 |
| 2024/0275911 A1* | 8/2024 | Agrawal | ................ H04N 5/272 |
| 2025/0095246 A1* | 3/2025 | Yamaguchi | ............... G06T 5/77 |

* cited by examiner

*Primary Examiner* — Hemant S Patel
(74) *Attorney, Agent, or Firm* — Lowenstein Sandler LLP

(57) ABSTRACT

Systems and methods for virtual meeting background freeze may include determining that a background of a video stream of a first client device of a participant of a virtual meeting is to be modified; identifying a first frame of the video stream as a candidate for the background of the video stream; and for each of one or more second frames of the video stream, generating a composite image by superimposing an image of a participant depicted in a respective second frame of the one or more second frames of the video stream on the background of the first frame using a location and a size of the image of the participant with respect to the respective second frame, and causing the composite image to be presented in a virtual meeting user interface (UI) on a second client device in place of the respective second frame.

20 Claims, 7 Drawing Sheets

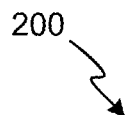

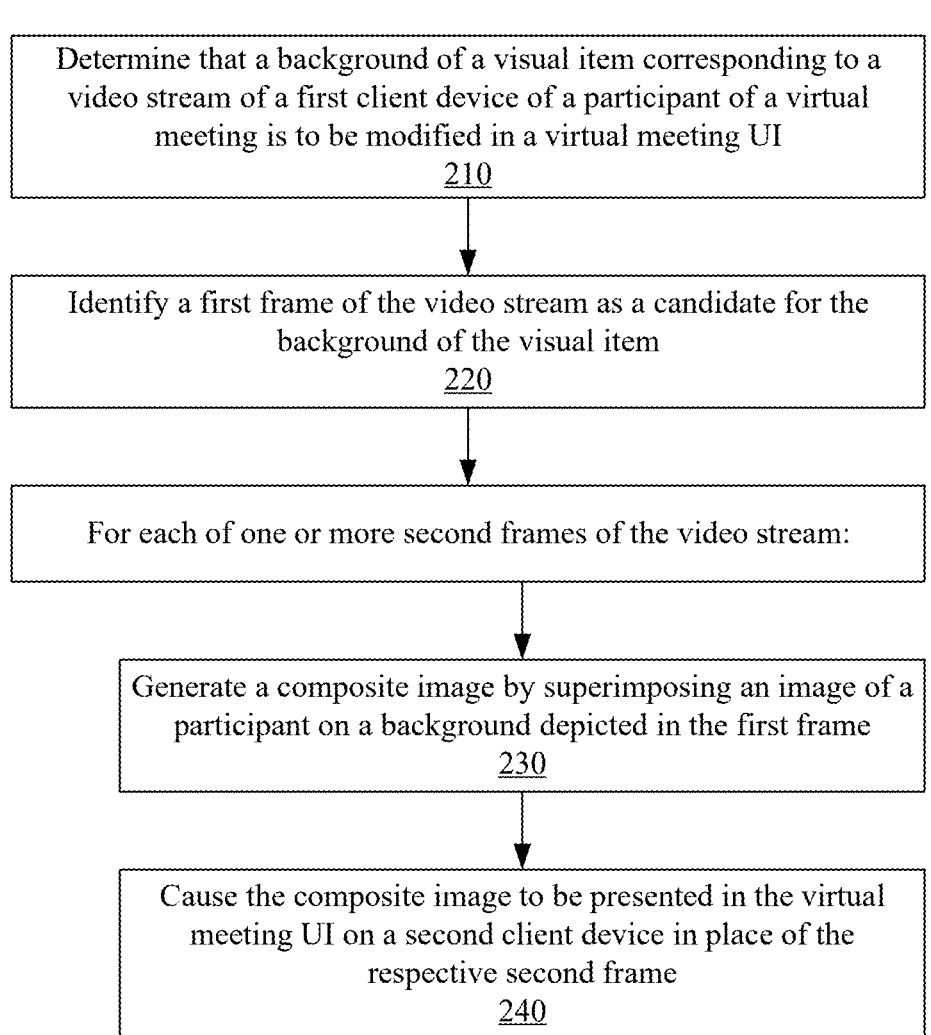

Determine that a background of a visual item corresponding to a video stream of a first client device of a participant of a virtual meeting is to be modified in a virtual meeting UI
210

Identify a first frame of the video stream as a candidate for the background of the visual item
220

For each of one or more second frames of the video stream:

Generate a composite image by superimposing an image of a participant on a background depicted in the first frame
230

Cause the composite image to be presented in the virtual meeting UI on a second client device in place of the respective second frame
240

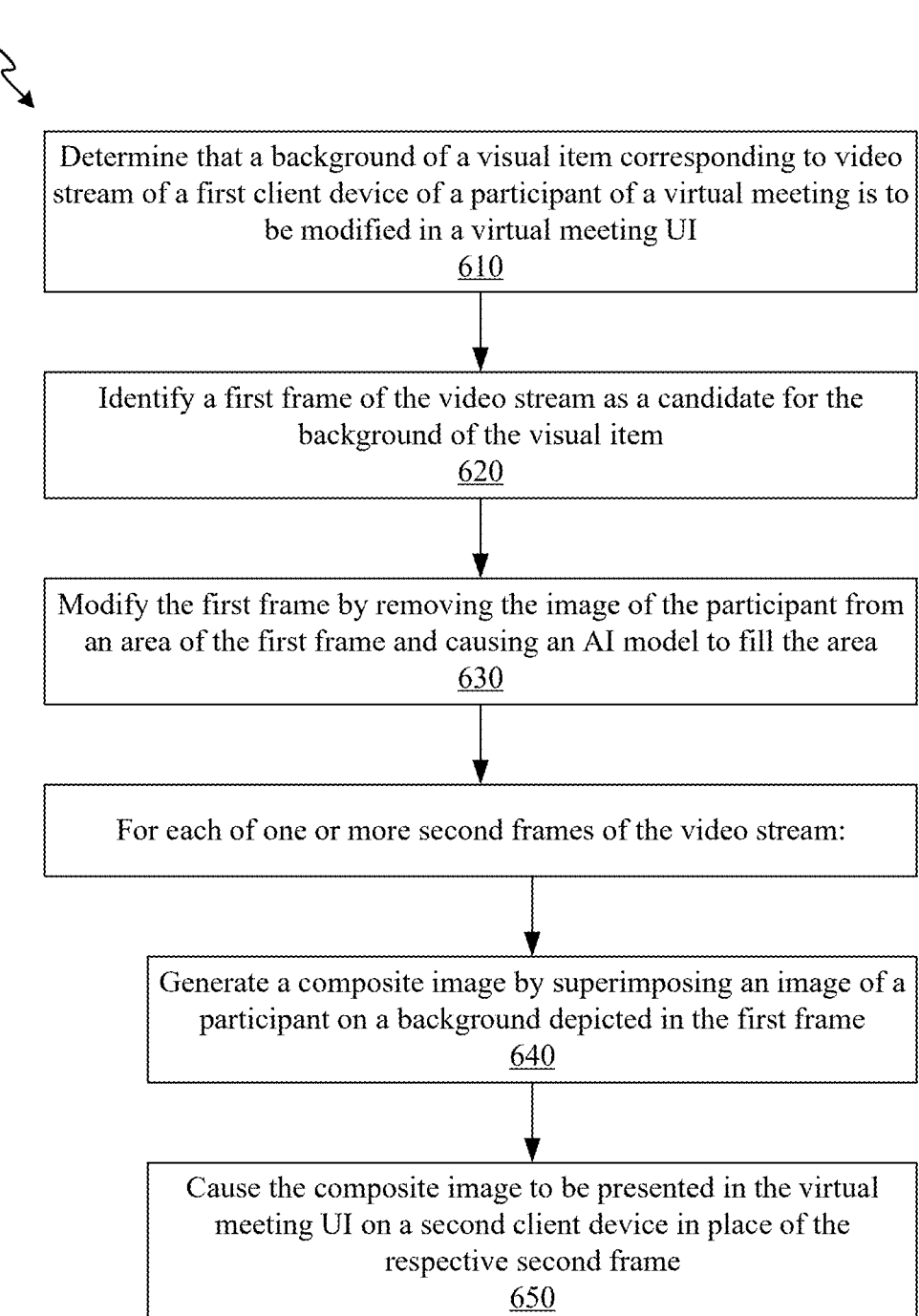

Determine that a background of a visual item corresponding to video stream of a first client device of a participant of a virtual meeting is to be modified in a virtual meeting UI
610

Identify a first frame of the video stream as a candidate for the background of the visual item
620

Modify the first frame by removing the image of the participant from an area of the first frame and causing an AI model to fill the area
630

For each of one or more second frames of the video stream:

Generate a composite image by superimposing an image of a participant on a background depicted in the first frame
640

Cause the composite image to be presented in the virtual meeting UI on a second client device in place of the respective second frame
650

FIG. 6

VIRTUAL MEETING BACKGROUND FREEZE

TECHNICAL FIELD

Aspects and implementations of the present disclosure relate to virtual meetings and more specifically to virtual meeting background freeze.

BACKGROUND

Virtual meetings can take place between multiple participants via a virtual meeting platform. A virtual meeting platform can include tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface that includes multiple regions to display the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method for virtual meeting background freeze. The method includes determining that a background of a visual item corresponding to a video stream of a first client device of a participant of a virtual meeting is to be modified in a virtual meeting user interface (UI). The method includes identifying a first frame of the video stream as a candidate for the background of the visual item. The method includes, for each of one or more second frames of the video stream, generating a composite image by superimposing an image of a participant depicted in a respective second frame of the one or more second frames of the video stream on a background depicted in the first frame using a location and a size of the image of the participant with respect to the respective second frame. The method includes, for each of the one or more second frames of the video stream, causing the composite image to be presented in the virtual meeting UI on a second client device in place of the respective second frame.

Another aspect of the disclosure provides a system for virtual meeting background freeze. The system includes a memory and one or processing devices coupled to the memory and configured to perform one or more operations. The operations include determining that a background of a visual item corresponding to a video stream of a first client device of a participant of a virtual meeting is to be modified in a virtual meeting UI. The operations include identifying a first frame of the video stream as a candidate for the background of the visual item. The operations include, for each of one or more second frames of the video stream, generating a composite image by superimposing an image of a participant depicted in a respective second frame of the one or more second frames of the video stream on a background depicted in the first frame using a location and a size of the image of the participant with respect to the respective second frame. The operations include, for each of the one or more second frames of the video stream, causing the composite image to be presented in the virtual meeting UI on a second client device in place of the respective second frame.

Another aspect of the disclosure provides another method for virtual meeting background freeze. The method includes determining that a background of a visual item corresponding to a video stream of a first client device of a participant of a virtual meeting is to be modified in a virtual meeting UI. The method includes identifying, at a first time, a first frame of the video stream as a candidate for the background of the visual item. The first frame may include an image of the participant in an area of the first frame. The method includes modifying the first frame by removing the image of the participant from the area and causing an artificial intelligence (AI) model to fill the area. The method includes, for each of one or more second frames of the video stream, generating a composite image by superimposing an image of a participant depicted in a respective second frame of the one or more second frames of the video stream on a background depicted in the first frame. The method includes, for each of the one or more second frames of the video stream, causing the composite image to be presented in the virtual meeting UI on a second client device in place of the respective second frame.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts a flow diagram of a method for performing virtual meeting background freeze, in accordance with some implementations of the present disclosure.

FIG. 6 depicts a flow diagram of a method for performing virtual meeting background freeze, in accordance with some implementations of the present disclosure.

DETAILED DESCRIPTION

Figure 1:
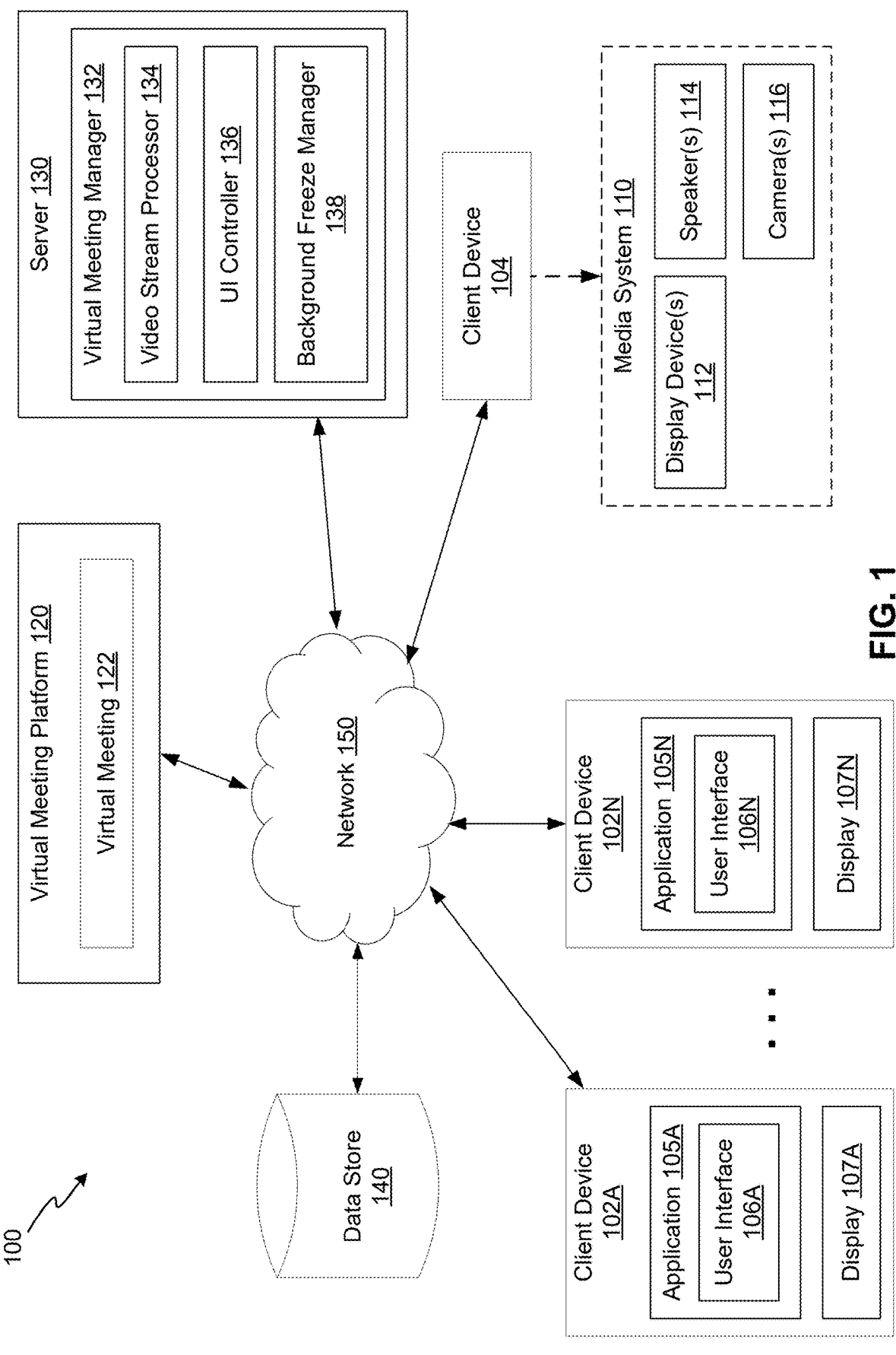
FIG. 1 illustrates an example system architecture for virtual meeting background freeze, in accordance with some implementations of the present disclosure.

Aspects of the present disclosure relate to freezing a virtual meeting participant's background for a virtual meeting. A virtual meeting platform can enable video-based conferences between multiple participants via respective client devices that are connected over a network and share each other's audio (e.g., voice of a user recorded via a microphone of a client device) and/or video streams (e.g., a video captured by a camera of a client device) during a virtual meeting. In some instances, a virtual meeting platform can enable a significant number of client devices (e.g., up to one hundred or more client devices) to be connected via the virtual meeting.

A participant of a virtual meeting can speak to the other participants of the virtual meeting. Some existing virtual meeting platforms can provide a user interface (UI) to each client device connected to the virtual meeting, where the UI includes a set of visual items that present the video streams shared over the network. However, current virtual meeting platforms are typically unable to align facial features and scale the size of the participants to a common value, contrary to face-to-face meetings, in which participants' facial features and body size usually match up. The mismatch present in current virtual meeting platforms generates an unrealistic visual display that causes a participant to jump between rows of differently sized and misaligned faces, resulting in meeting fatigue due to frequent eye movement and increasing cognitive load, thereby devaluing the quality of the user experience.

Some systems can use auto-framing to handle the above discussed issues. The auto-framing may zoom in or out from a participant to keep the image of the participant at a constant size, but this zooming in and out is also applied to the participant's background, causing movement of the background. Similarly, the auto-framing may place the image of the participant near the center of the UI region corresponding to the participant, but this may also place the background of the participant near the center as well, causing movement of the background. This constant movement of the background of the auto-framed participant can generate a queasy or sea-sick like feeling in other participants, which results in an unpleasant experience for these participants.

Implementations of the present disclosure address the above and other deficiencies by freezing a virtual meeting participant's background in a virtual meeting UI while still using auto-framing to keep the participant centered and at a constant size. In particular, a virtual meeting application can determine that the background of a visual item corresponding to a video stream of a virtual meeting participant is to be modified. A visual item can refer to a UI element that occupies a particular region in the UI and is dedicated to presenting the video stream from a client device of the virtual meeting participant. The application may identify a first frame of the video stream as a candidate for the background of the visual item. The application may modify the first frame, which may contain both an image of the virtual meeting participant and the participant's background, by removing the image of the participant from the first frame and using an artificial intelligence (AI) model to fill in the area of the first frame that previously contained the image of the participant.

In one or more second frames of the video stream, the virtual meeting application may generate a composite image by superimposing an image of the participant, as depicted in a respective second frame onto the background depicted in the first frame. The application may superimpose the image of the participant using a location and a size of the image of the participant with respect to the respective second frame. In other words, the application may superimpose the image of the participant onto the background using auto-framing to keep the image of the participant relatively centered and at a constant size from frame to frame while keeping the background immobile. In this manner, the virtual meeting application applies auto-framing of a virtual meeting participant while keeping the background immobile.

Aspects of the present disclosure provide technical advantages over previous solutions. Aspects of the present disclosure can provide an additional functionality to a virtual meeting platform by providing tools that generate optimal framing while keeping a participant's background immobile. The functionality provides an improved user experience during virtual meetings by reducing queasy or sea-sick like feelings, fatigue, and other possible discomforts, while improving user participation in virtual meetings.

FIG. 1 illustrates an example system architecture 100, in accordance with implementations of the present disclosure. System architecture 100 includes one or more client devices 102A-102N or 104, a virtual meeting platform 120, a server 130, and a data store 140, each connected to a network 150.

In some implementations, the virtual meeting platform 120 can enable users of one or more of the client devices 102A-102N, 104 to connect with each other in a virtual meeting (e.g., a virtual meeting 122). A virtual meeting 122 refers to a real-time communication session such as a video-based call or video chat, in which participants can connect with multiple additional participants in real-time and be provided with audio and video capabilities. A virtual meeting 122 may include an audio-based call or chat, in which participants connect with multiple additional participants in real-time and are provided with audio capabilities. Real-time communication refers to the ability for users to communicate (e.g., exchange information) instantly without transmission delays and/or with negligible (e.g., milliseconds or microseconds) latency. The virtual meeting platform 120 can allow a user of the virtual meeting platform 120 to join and participate in a virtual meeting 122 with other users of the virtual meeting platform 120 (such users sometimes being referred to, herein, as "virtual meeting participants" or, simply, "participants"). Implementations of the present disclosure can be implemented with any number of participants connecting via the virtual meeting 122 (e.g., up to one hundred or more).

In implementations of the disclosure, a "user" or "participant" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether the virtual meeting platform 120 or a virtual meeting manager 132 (discussed below) collects user information (e.g., information about a user's social network, social actions or activities, profession, a user's preferences, or a user's current location), or to control whether or how to receive content from the virtual meeting platform 120 or the virtual meeting manager 132 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the virtual meeting platform 120 or the virtual meeting manager 132.

In some implementations, the server 130 may include a virtual meeting manager 132. The virtual meeting manager 132, in one or more implementations, may be configured to manage a virtual meeting 122 between multiple users of the virtual meeting platform 120. In some implementations, the virtual meeting manager 132 can provide the virtual meeting UIs 106A-106N (sometimes referred to as, simply, "the UIs 106A-106N") to each client device 102A-N, 104 to enable users to watch and listen to each other during a virtual meeting 122. The virtual meeting manager 132 can also collect and provide data associated with the virtual meeting 122 to each participant of the virtual meeting 122. In some implementations, virtual meeting manager 132 can provide the UIs 106A-106N for presentation by client applications 105A-N. For example, the respective UIs 106A-106N can be displayed on the display devices 107A-107N by the client applications 105A-N executing on the operating systems of the client devices 102A-102N, 104. In some implementations, the virtual meeting manager 132 can determine visual items for presentation in the UIs 106A-106N during a virtual meeting 122. As discussed above, a visual item can refer to a UI element that occupies a particular region in the UI 106A-106N and is dedicated to presenting a video stream from a respective client device. Such a video stream can depict, for example, a user of the respective client device 102A-N, 104 while the user is participating in the virtual meeting 122 (e.g., speaking, presenting, listening to other participants, watching other participants, etc., at particular moments during the virtual meeting 122), a physical conference or meeting room (e.g., with one or more participants present), a document or media content (e.g., video content, one or more images, etc.) being presented during the virtual meeting 122, etc.

In some implementations, the virtual meeting manager 132 may include a video stream processor 134 and a UI controller 136. Each of the video stream processor 134 or the UI controller 136 may include a software application (or a subset thereof) that performs certain virtual meeting functionality for the virtual meeting 122. The video stream processor 134 may be configured to receive video streams from one or more of the client devices 102A-102N, 104. The video stream processor 134 may be configured to determine visual items for presentation in the UI 106A-106N of such client devices 102A-N, 104 during the virtual meeting 122. Each visual item can correspond to a video stream from a client device (e.g., the video stream pertaining to one or more participants of the virtual meeting 122). In some implementations, the video stream processor 134 can receive audio streams associated with the video streams from the client devices (e.g., from an audiovisual component of the client devices 102A-102N). Once the video stream processor 134 has determined visual items for presentation in the UI 106A-106N, the video stream processor 134 can notify the UI controller 136 of the determined visual items. The visual items for presentation can be determined based on current speaker, current presenter, order of the participants joining the virtual meeting 122, list of participants (e.g., alphabetical), configuration settings, etc.

In some implementations, the UI controller 136 can provide the UI 106A-106N for the virtual meeting 122. The UI 106A-106N can include multiple regions. Each region can display a visual item corresponding to a video stream pertaining to one or more participants of the virtual meeting 122. The UI controller 136 can control which video stream's visual item is to be displayed in a specific region of a virtual meeting UI 106A-106N. The UI controller 136 can generate the UIs 106A-106N for the different client devices 102A-

102N, 104 and provide the UIs 106A-106N to the client devices 102A-102N, 104. The UI controller 136 can generate different UIs 106A-106N for different client devices 102A-102N, 104. In some implementations, the UI controller 136 can generate partial virtual meeting UIs 106A-106N for the applications 105A-105N, and the applications 105A-105N can finalize the UIs 106A-106N for display on the displays 107A-107N.

In one or more implementations, the virtual meeting manager 132 may include a background freeze manager 138. The background freeze manager 138 may include a software application (or a subset thereof) that performs certain virtual meeting functionality for a virtual meeting 122. The background freeze manager 138 may be configured to determine that the background of a virtual meeting participant's visual item is to be modified (e.g., frozen), identify a frame of the video stream as a candidate for the modified background, generate a series of frames that each include a composite image including an image of the participant using autoframing superimposed over the candidate background, and cause the series of composite images to be presented in a UI 106A-N of other client devices 102A-N, 104 during the virtual meeting 122, as will be discussed below in more detail with respect to FIGS. 2 and 6.

As used herein, the term "background" may refer to an area in a virtual meeting participant's visual item that surrounds the image of the participant. The background may include a real physical background, which may include a location and one or more objects near the participant and that are viewable from the participant's video camera. The background may include a virtual background, which may include an image over which an image of the participant is superimposed and replaces the participant's real physical background during the virtual meeting.

In some implementations, the virtual meeting platform 120 or the server 130 can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a virtual meeting 122. The virtual meeting platform 120 can also include a website (e.g., one or more webpages) or application back-end software that can be used to enable a user to connect with other users by way of the virtual meeting 122.

In some implementations, the one or more client devices 102A-102N can each include one or more computing devices such as personal computers (PCs), laptops, mobile phones, smart phones, tablet computers, netbook computers, network-connected televisions, etc. In some implementations, the one or more client devices 102A-102N can also be referred to as "user devices." Each client device 102A-102N can include an audiovisual component that can generate audio and video data to be streamed to the virtual meeting platform 120. In one or more implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some implementations, the system architecture 100 may include a client device 104. The client device 104 may differ from a client device of the one or more client devices 102A-N because the client device 104 may be associated with a physical conference or meeting room. Such client device 104 can include or be coupled to a media system 110 that can include one or more display devices 112, one or more speakers 114 and one or more cameras 116. Display device 112 can be, for example, a smart display or a non-smart display (e.g., a display that is not itself configured to connect to the network 150). Users that are physically present in the room can use the media system 110 rather than their own devices (e.g., one or more of the client devices 102A-102N) to participate in the virtual meeting 122, which can include other remote users. For example, the users in the room that participate in the virtual meeting 122 can control the display device 112 to show a slide presentation or watch slide presentations of other participants. Sound and/or camera control can similarly be performed. Similar to client devices 102A-102N, the one or more client devices 104 can generate audio and video data to be streamed to the virtual meeting platform 120 (e.g., using one or more microphones, speakers 114 and cameras 116).

As described previously, an audiovisual component of each client device 102A-N, 104 can capture images and generate video data (e.g., a video stream) of the captured data of the captured images. In some implementations, the client devices 102A-102N, 104 can transmit the generated video stream to virtual meeting manager 132. The audiovisual component of each client device 102A-N, 104 can also capture an audio signal representing speech of a user and generate audio data (e.g., an audio file or audio stream) based on the captured audio signal. In some implementations, the client devices 102A-102N, 104 can transmit the generated audio data to the virtual meeting manager 132.

In some implementations, each client device 102A-102N or 104 can include client application 105A-N, which can be a mobile application, a desktop application, a web browser, etc. In some implementations, the client application 105A-N can present, on a display device 107-107N of a client device 102A-102N or a UI (e.g., a UI of the UIs 106A-106N), one or more features of the application 105A-N for users to access the virtual meeting platform 120. For example, a user of client device 102A can join and participate in the virtual meeting 122 via a UI 106A presented on the display device 107A by the application 105A. The user can present a document to participants of the virtual meeting 122 using the UI 106A. Each of the UIs 106A-106N can include multiple regions to present visual items corresponding to video streams of the client devices 102A-102N provided to the server 130 for the virtual meeting 122. In some implementations, the application 105A-N can provide auto-framing functionality, as discussed further below.

In one or more implementations, the background freeze manager 138 may be part of a client device 102A-102N, 104. For example, the application 105A-105N may include the background freeze manager 138. In one implementation, the application 105A of the client device 102A can generate a video stream. The video stream may include composite images created by superimposing sequential images of the participant that is using the client device 102A on an background image, as discussed herein. The application 105A can send the video stream to the virtual meeting manager 132, which can use the UI controller 136 to generate the virtual meeting UIs and provide the UIs to the client devices 102A-102N, 104. In some implementations, the application 105A can send the video stream to the other client devices 102B-N, 104, and receive the video streams from the other client devices 102B-N, 104, and the applications 105A-105N can generate their respective virtual meeting UIs 106A-106N or can finalize their respective UIs 106A-106N, which may have been partially generated by the UI controller 136.

In some implementations, the data store 140 is a persistent storage that is capable of storing data as well as data structures to tag, organize, and index the data. A data item can include audio data and/or video stream data, in accordance with implementations described herein. The data store 140 can be hosted by one or more storage devices, such as main memory, magnetic or optical storage-based disks, tapes, hard drives, flash memory, and so forth. In some implementations, the data store 140 can be a network-attached file server, while in other implementations, the data store 140 can be some other type of persistent storage such as an object-oriented database, a relational database, and so forth, that can be hosted by the virtual meeting platform 120 or one or more different machines (e.g., the server 130) coupled to the virtual meeting platform 120 using the network 150. In some implementations, the data store 140 can store portions of audio and video streams received from one or more client devices 102A-102N for the virtual meeting platform 120. Moreover, the data store 140 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N and/or concurrently editable by the users.

In some implementations, the network 150 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

It should be noted that in some other implementations, the functions of the virtual meeting platform 120 or the server 130 can be provided by a fewer number of machines. For example, in some implementations, the server 130 can be integrated into a single machine, while in other implementations, the server 130 can be integrated into multiple machines. In addition, in some implementations, the server 130 can be integrated into the virtual meeting platform 120.

In general, one or more functions described in the several implementations as being performed by the virtual meeting platform 120 or server 130 can also be performed by the client devices 102A-N, 104 in other implementations, if appropriate. In addition, in some implementations, the functionality attributed to a particular component can be performed by different or multiple components operating together. The virtual meeting platform 120 or the server 130 can also be accessed as a service provided to other systems or devices through appropriate application programming interfaces, and thus is not limited to use in websites.

Although implementations of the disclosure are discussed in terms of the virtual meeting platform 120 and users of the virtual meeting platform 120 participating in a virtual meeting 122, implementations can also be generally applied to any type of telephone call, conference call, or other technological communications methods between users. Implementations of the disclosure are not limited to virtual meeting platforms that provide virtual meeting tools to users.

FIG. 2 is a flowchart illustrating one embodiment of a method 200 for performing background freeze during a virtual meeting 122, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 200 and/or one or more of the method's 200 individual functions, routines, subroutines, or operations. In certain implementations, a single processing thread can perform the method 200. Alternatively, two or more processing threads can perform the method 200, each thread executing one or more individual functions, routines, subroutines, or operations of the method. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional. In some implementations, the background freeze manager 138 can perform one or more of the operations of the method 200.

At block 210, processing logic determines that a background of a visual item corresponding to a video stream of a first client device 102A of a first participant of a virtual meeting 122 is to be modified in a virtual meeting UI. Determining that the background of the first participant's visual item is to be modified may include receiving user input from the application 105A of the client device 102A. For example, the participant using the client device 102A can select an option of the UI 106A indicating that the participant desires to use the background freeze feature of the virtual meeting platform 120. In one implementation, the background freeze feature can be enabled by default in the application 105A.

At block 220, processing logic identifies a first frame of the video stream as a candidate for the background of the visual item. The first frame may include a frame from the video stream provided by the application 105A. The first frame may include a video frame obtained from a camera that is in data communication with the client device 102A (e.g., a camera integrated with the client device 102A or a universal serial bus (USB) camera plugged into a port of the client device 102A). The first frame may include an image of the participant using the client device 102A and may include an image of a background around or behind the image of participant.

Figure 3:
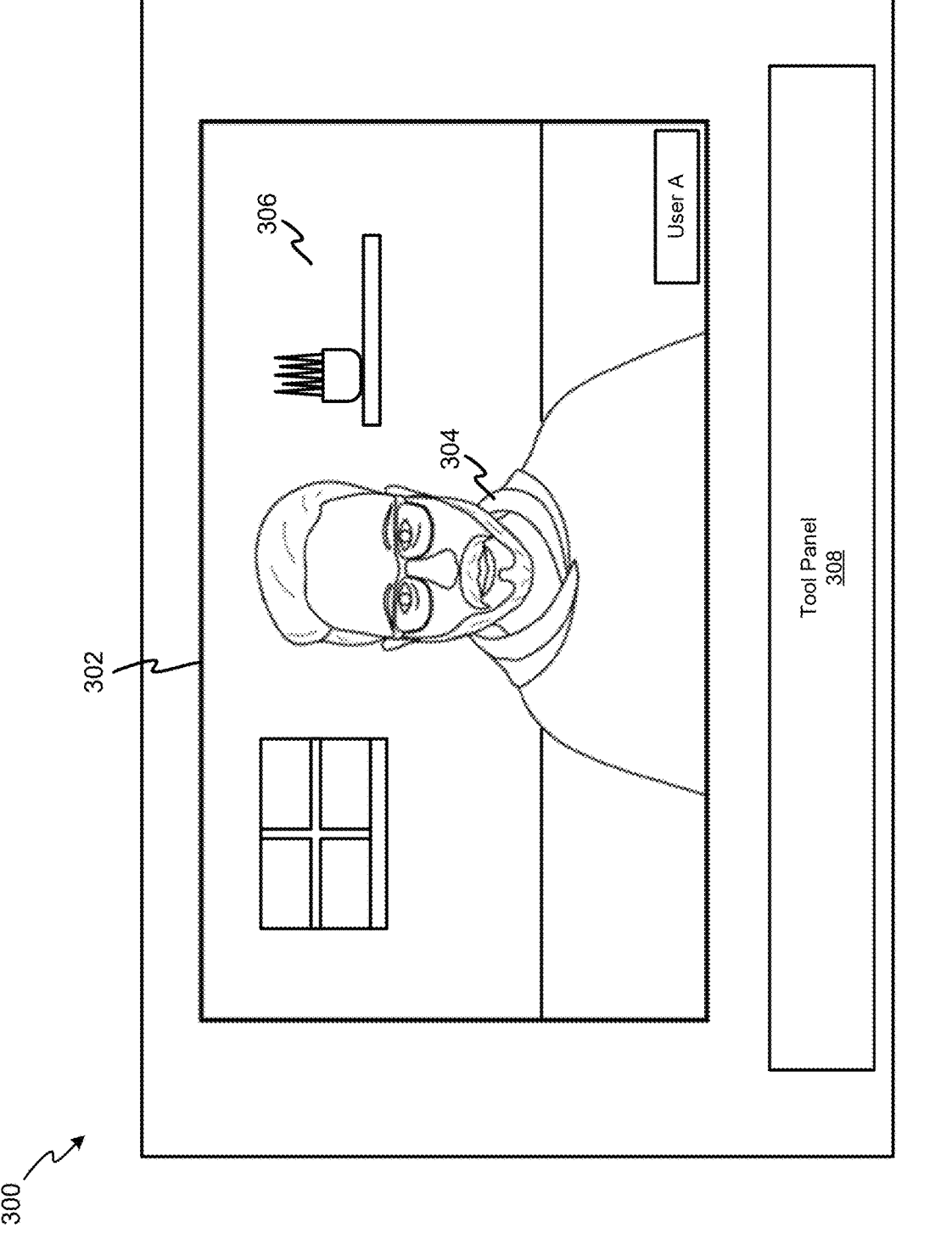
FIG. 3 illustrates an example user interface for identifying a candidate background for virtual meeting background freeze, in accordance with some implementations of the present disclosure.

FIG. 3 illustrates an example UI 300, in accordance with some implementations of the present disclosure. The UI 300 can form part of the UI 106A. As can be seen, the UI 300 may include a visual item presenting a first frame 302 of a video stream. The video stream may include video captured by a camera (e.g., as a series of video frames) of a client device 102A during a virtual meeting 122. The first frame 302 depicted in FIG. 3 may be the first frame disclosed in block 220. The first frame 302 may include an image 304 of the participant and an image 306 of the background. The UI 300 may include a tool panel 308. The tool panel 308 may include UI elements (e.g., a buttons) to select desired audio features, video features, etc. In some implementations, tool panel 308 can include a UI element to enable/disable implementations of the present disclosure, such as, for example, a UI element to enable/disable the background freeze feature during the virtual meeting 122.

In some implementations, as depicted in FIG. 3, the first frame 302 may include an image 304 of the participant in an area of the first frame 302. The background freeze manager 138 can remove the image 304 of the participant from the area (and perform other modifications resulting in an updated visual item, as discussed herein). As a result, the first frame 302 may include an image 306 of the background with a blank space in the area where the image 304 of the participant used to be located.

In one implementation, the background freeze manager 138 may be part of application 105A. Alternatively, the background freeze manager 138 may be part of the virtual meeting manager 132 hosted by the server 130, and the application 105A can send the video stream including the first frame 302 to the virtual meeting manager 132, and the background freeze manager 138 can perform background freeze-related functionality discussed herein (e.g., remove the image 304 of the participant from the area of the first frame 302).

In one implementation, the background freeze manager 138 can use an AI model to fill the area. Filling the area may include filling the area with image data such that the area is not blank and blends into the original portion of the image 306 of the background. In one implementation, the background freeze manager 138 can feed the first frame 302 with the image 306 of the background and the blank area as input into the AI model. The background freeze manager 138 can obtain, from the AI model, one or more outputs. An output can provide filled-in content for the blank area of the first frame 302, or the output may include the filled-in first frame 302. The filled-in first frame 302 may then be used as the background of the participant's visual item during the virtual meeting 122. As discussed above, in some embodiments, the AI model and the background freeze manager 138 can reside on the client device 102A. Alternatively, the AI model and the background freeze manager 138 can reside on the server 130 or virtual meeting platform 120.

In one embodiment, the AI model may include one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron may be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that may be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one embodiment, the AI model may include a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), a large language model (LLM), or a diffusion model. In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some embodiments, the AI model can be an AI model that has been trained on a corpus of data. In some embodiments, the AI model can be a model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model to learn broad elements including, image or speech recognition, general sentence structure, common phrases, vocabulary, natural language structure, and other elements. In some embodiments, this first, foundational model can be trained using self-supervision, or unsupervised training on such datasets.

In some embodiments, the second portion of training, including fine-tuning, may be unsupervised, supervised, reinforced, or any other type of training. In some embodiments, this second portion of training may include some elements of supervision, including learning techniques incorporating human or machine-generated feedback, undergoing training according to a set of guidelines, or training on a previously labeled set of data, etc. In a non-limiting example associated with reinforcement learning, the outputs of the AI model while training may be ranked by a user, according to a variety of factors, including accuracy, helpfulness, veracity, acceptability, or any other metric useful in the fine-tuning portion of training. In this manner, the AI model can learn to favor these and any other factors relevant to users when generating a response. Further details regarding training are provided below.

In some embodiments, the AI model may include one or more pre-trained models, or fine-tuned models. In a non-limiting example, in some embodiments, the goal of the "fine-tuning" may be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

As indicated above, the AI model may be one or more generative AI models, allowing for the generation of new and original content. The generative AI model can use other machine learning models including an encoder-decoder architecture including one or more self-attention mechanisms, and one or more feed-forward mechanisms. In one implementation, the generative AI model may include a diffusion model. A diffusion model may include a deep generative model that can be used to generate images, edit existing images, and create new image styles. The diffusion model may have been trained by iteratively applying a diffusion process to an input image, which may include gradually adding noise to the image until it becomes unrecognizable. The diffusion model then learns to reverse this process, starting from the noisy image and gradually denoising it until it becomes a recognizable image. In some implementation, the diffusion model may have been trained on multiple virtual meeting backgrounds by using different virtual meeting backgrounds as input images during the training process.

Returning to FIG. 2, for each of one or more second frames of the video stream, at block 230, processing logic generates a composite image by superimposing an image of a participant depicted in a respective second frame of the one or more second frames of the video stream on the background of the first frame 302. In some implementations, generating the composite image by superimposing the image of the participant on the background of the first frame 302 includes using a location and a size of the image of the participant with respect to the respective second frame.

In one implementation, the background freeze manager 138 obtains the image of the participant in the respective second frame. The background freeze manager 138 can obtain the second frame and use a delineation operation to separate the image of the participant from the image of the background of the second frame. The background freeze manager 138 can superimpose the image of the participant on the background of the first frame 302. The background of the first frame 302 may include the background identified in block 220 (which may include the first frame 302 as modified using the AI model to remove the image 304 of the participant and fill in the blank area of the image 306 of the background).

In one or more implementations, the background freeze manager 138 superimposes the image of the participant on the image of the background using a location and a size of the image of the participant with respect to the respective second frame. The location and size of the image of the participant may include a location and size determined by an auto-framing operation. The location may include a location substantially in the center of the second frame, and the size may include a size such that the edges of the image of the participant's head are a predetermined distance from some of the edges of the second frame. In this manner, the image of the participant can remain substantially centered and at a consistent size from frame to frame (e.g., as a result of using the auto-framing operations) while the background behind the image of the participant remains immobile. Thus, the disadvantage of constant movement of the background of the auto-framed participant in conventional virtual meeting systems is eliminated.

In some implementations, block 230 may include the background freeze manager 138 performing a position detection operation on the image of the participant. The position detection operation can identify a head outline of the image of the participant. The head outline may include data indicating where, in the image of the participant, the edges of the participant's head are located. The position detection operation can identify a location of one or more facial features in the image of the participant. The background freeze manager 138 can use the identified head outline or facial feature locations to help superimpose the image of the participant in the correct location over the background and at the correct size.

In one implementation, superimposing the image of the participant on the background includes superimposing the image of the participant in a center portion of the background based on the one or more facial feature locations. Superimposing the image of the participant in a location based on the one or more facial feature locations can help keep the image of the participant substantially centered in the participant's video stream even if the participant moves around relative to the client device's 102A camera (e.g., the participant moving left or right or moving up or down). Keeping the participant substantially centered may result in a better viewing experience for other virtual meeting 122 participants. As an example, the background freeze manager 138 can place the image of the participant over the background such that the one or more facial features are substantially equidistant from the left and right sides of the background. In one implementation, superimposing the image of the participant on the background includes superimposing the image of the participant such that certain facial features of the participants whose video streams are located in a same row on a virtual meeting UI 106A-N are on the same horizontal level.

Figure 4:
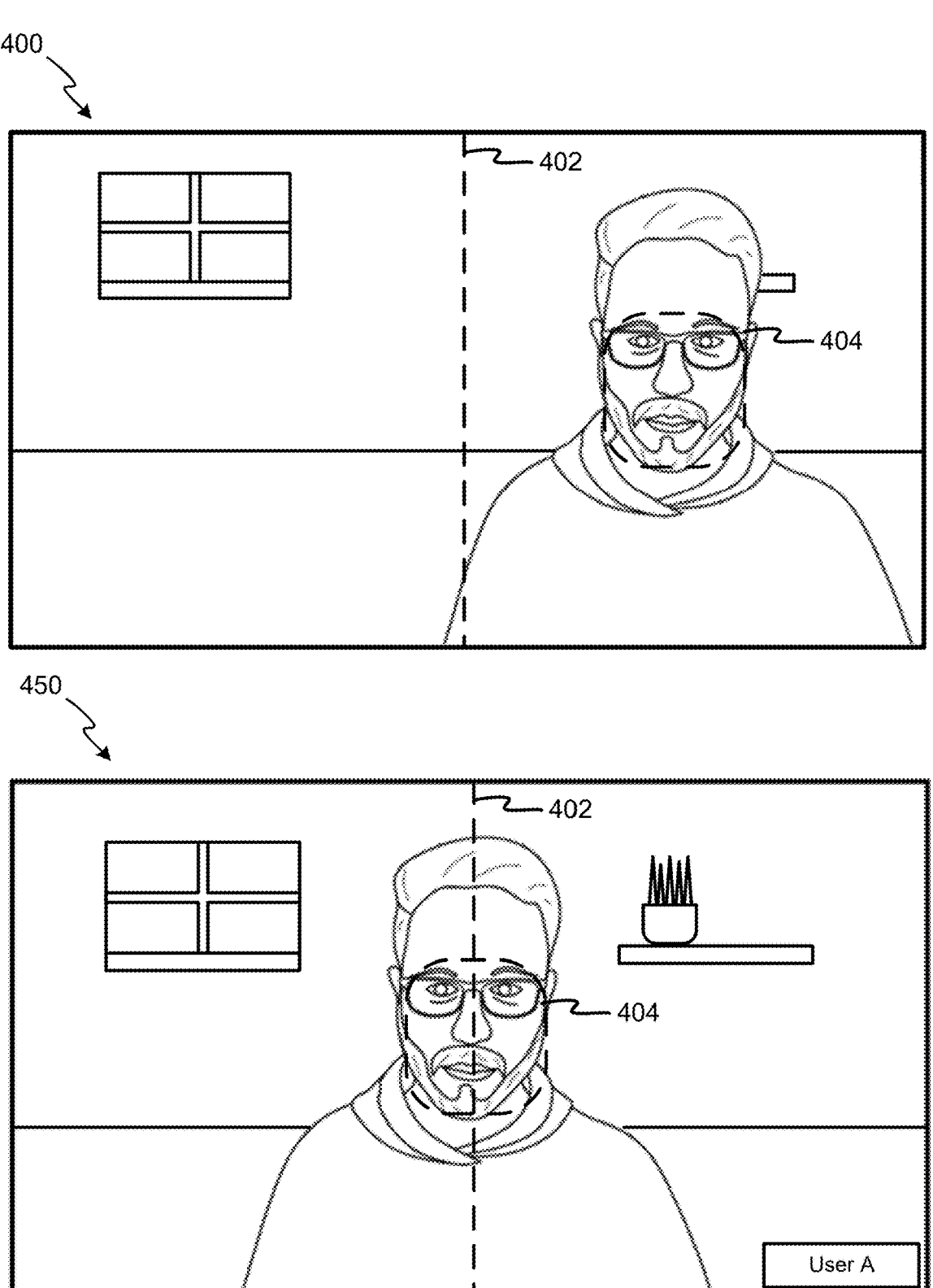
FIG. 4 depicts example user interfaces demonstrating use of the virtual meeting background freeze, in accordance with some implementations of the present disclosure.

FIG. 4 illustrates example visual items depicting frames 400 and 450 contrasting non-use of the background freeze feature (depicted frame 400) with use of the background freeze feature (depicted frame 450). As seen in FIG. 4, the depicted frame 400 may include a center line 402 that indicates locations in the depicted frame 400 that are equidistant from the left and right sides of the depicted frame 400. The depicted frame 400 may include an facial feature area 404, which may include an outline of an area that a component of the application 105A or the virtual meeting platform 120 recognized as containing one or more facial features of the participant. As can be seen in FIG. 4, the participant has moved to the participant's left (the viewer's right), and since the background freeze feature is not active, the participant is not centered in the depicted frame 400. In contrast, in the depicted frame 450, the background freeze feature is active. As seen in depicted frame 450, the background freeze manager 138 has superimposed the image of the participant over the background such that the facial feature area 404 is located on the center line 402. Furthermore, the image of the participant is centered over the background identified in block 220 instead of over the participant's current background (seen in depicted frame 400), which results in the background being immobile from frame to frame and creates a more pleasant viewing experience for virtual meeting 122 participants.

In some implementations, superimposing the image of the participant on the background includes superimposing a head of the image of the participant a predetermined distance from an edge of the background based on the head outline. Superimposing the image of the participant at a predetermined distance from the edge of the background can help keep the image of the participant at a substantially consistent size even if the participant moves closer to or further away from the camera. Keeping the participant's head a substantially consistent size can result in a better viewing experience for other virtual meeting 122 participants. As an example, the background freeze manager 138 can superimpose the image of the participant such that a distance from the top edge of the head outline of the participant to the top edge of the background substantially equals a first predetermined distance, a distance from the bottom edge of the head outline to the bottom edge of the background substantially equals a second predetermined distance, a distance from the left edge of the head outline to the left edge of the background substantially equals a third predetermined distance, or a distance from the right edge of the head outline to the right edge of the background substantially equals a fourth predetermined distance. In some implementations, the first and second distances may be substantially equal, or the third and fourth distances may be substantially equal.

Figure 5:
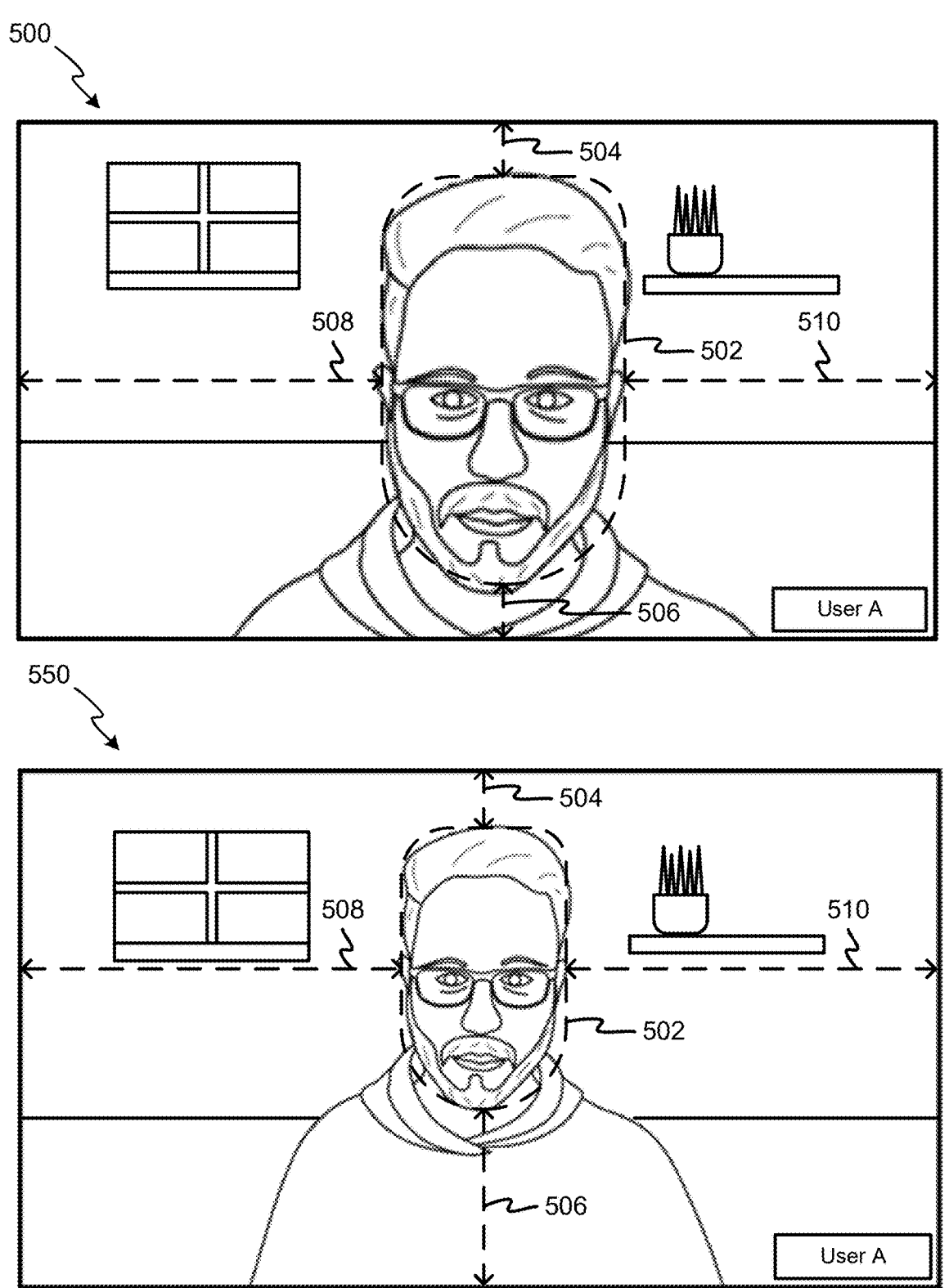
FIG. 5 depicts example user interfaces demonstrating use of the virtual meeting background freeze, in accordance with some implementations of the present disclosure.

FIG. 5 illustrate example visual items depicting second frames 500 and 550 contrasting non-use of the background freeze feature (depicted frame 500) with use of the background freeze feature (depicted frame 550). The depicted frame 500 may include a head outline 502. The depicted frame 500 may include a first distance 504, a second distance 506, a third distance 508, and a fourth distance 510. As depicted by the example frame 500, the participant has moved closer to the camera of the client device 102A and, thus, since the background freeze feature is not active, the first distance 504 may be smaller than the first predetermined distance, the second distance 506 may be smaller than the second predetermined distance, the third distance 508 may be smaller than the third predetermined distance, and the fourth distance 510 may be smaller than the fourth predetermined distance. This may result in the image of the participant appearing larger in the depicted frame 500. In contrast, in the depicted frame 550, the background freeze manager 138 has superimposed the image of the participant over the background such that the first distance 504 is substantially equal to the first predetermined distance, the second distance 506 is substantially equal to the second predetermined distance, the third distance 508 is substantially equal to the third predetermined distance, and the fourth distance 510 is substantially equal to the fourth predetermined distance. This may result in the image of the participant remaining substantially the same in size from frame to frame, even if the participant moves closer to or further away from the client device's 102A camera. Furthermore, the size of the background behind the image of the participant is the size of the background identified in block 220 instead of the being zoomed in or out on the background currently behind the participant, which results in the background being the same size from frame to frame and creates a more pleasant viewing experience for virtual meeting 122 participants.

Returning to FIG. 2, for each of one or more second frames of the video stream at block 240, processing logic causes the composite image to be presented in the virtual meeting UI on a second client device 102B-N, 104 in place of the respective second frame. The virtual meeting UI may include the UI 106B-N of the client devices 102B-N, 104.

In one implementation, the client device 102A sends, as part of the client device's 102A video stream, the composite image to the video stream processor 134 of the virtual meeting 122 (e.g., where the background freeze manager 138 is part of the application 105A-N). Alternatively, the server 130 can create the composite image as discussed herein (e.g., using a background freeze manager 138 executing on the server 130). The UI controller 136 of the virtual meeting 122 can send the composite image, as part of a video stream, to the other client devices 102B-N, 104 or create a UI with a visual item corresponding to the video stream with the composite image to be displayed in a region pertaining to the participant of the client device 102A, and provides the UI to the other client devices 102B-N, 104 to be displayed as part of the UIs 106A-N. As a result, the other participants can view the visual item presenting the visual stream of the participant of the client device 102A, and the video stream may include the one or more second frames where the background freeze feature is activated. Thus, the other participants may view the visual item corresponding to the video stream of the participant of the client device 102A, which may include auto-framing, but the background of the visual item may not move (because of the background freeze feature being activated), which results in a more pleasant virtual meeting 122 experience for the other participants.

In one implementation, the UI 106A of the client device 102A also displays the visual item corresponding the video stream containing the one or more second frames (i.e., the participant can see the visual item with the participant's own UI 106A). This can allow the participant to view the visual item presenting their own video stream and determine whether the background freeze feature is working correctly, whether the background is acceptable to the participant, etc.

In some implementations, block 220 occurs at a preparation phase of the virtual meeting 122. The preparation phase may include a presentation of a UI of the application 105A that allows the participant to prepare to enter the virtual meeting 122. While in the preparation phase, the video stream processor 134 may not stream video or audio from the first participant's client device 102A to one or more other client devices 102B-N, 104, or the application 105A may not stream video or audio to the virtual meeting platform 120 or to one or more other client devices 102B-N, 104. The preparation phase can allow the participant to adjust audio or microphone levels, get positioned in front of the camera of the client device 102A, or perform other virtual meeting 122 preparation tasks. The preparation phase can allow the background freeze manager 138 to identify a first frame 302 of the video stream of the client device 102A as a candidate for the background of the video stream. The preparation phase can allow for the background freeze manager 138 to modify the first frame 302 to remove the image 304 of the participant and fill in the image 306 of the background, as discussed above.

In one or more implementations, the one or more second frames includes frames from the video stream occurring during a live phase of the virtual meeting 122. A live phase may refer to a phase in which virtual meeting participants are able to interact with each other (e.g., view or hear each other in real-time (or near real-time due to transmission delays, etc.) during the virtual meeting 122). This may include the client devices 102A-N, 104 providing their respective video streams to the server 130 or to each other.

FIG. 6 is a flowchart illustrating one embodiment of a method 600 for performing background freeze during a virtual meeting, in accordance with some implementations of the present disclosure. A processing device, having one or more (CPU(s), one or more GPU(s), and/or memory devices communicatively coupled to the one or more CPU(s) and/or GPU(s) can perform the method 600 and/or one or more of the method's 600 individual functions, routines, subroutines, or operations. In certain implementations, a single processing thread can perform the method 600. Alternatively, two or more processing threads can perform the method 600, each thread executing one or more individual functions, routines, subroutines, or operations of the method. In an illustrative example, the processing threads implementing the method 600 can be synchronized (e.g., using semaphores, critical sections, and/or other thread synchronization mechanisms). Alternatively, the processing threads implementing the method 600 can be executed asynchronously with respect to each other. Various operations of the method 600 can be performed in a different (e.g., reversed) order compared with the order shown in FIG. 6. Some operations of the method 600 can be performed concurrently with other operations. Some operations can be optional. In some implementations, the background freeze manager 138 can perform one or more of the operations of the method 600.

At block 610, processing logic determines that a background of a visual item corresponding to a video stream of a first client device of a participant of a virtual meeting is to be modified in a virtual meeting UI. Block 610 may include similar functionality to the functionality of block 210 of the method 200 of FIG. 2.

At block 620, processing logic identifies a first frame of the video stream as a candidate for the background of the visual item. The first frame may include an image of the participant in an area of the first frame. Block 620 may include similar functionality to the functionality of block 220 of the method 200.

At block 630, processing logic modifies the first frame by removing the image of the participant from the area and causing an AI model to fill the area. Block 630 may include similar functionality to functionality of block 220 of the method 200.

For each of one or more second frames of the video stream, at block 640, processing logic generates a composite image by superimposing an image of a participant depicted in a respective second frame of the one or more second frames of the video stream on a background depicted in the first frame. Block 640 may include similar functionality to the functionality of block 230 of the method 200. For each of one or more second frames of the video stream, at block 650, processing logic causes the composite image to be presented in the virtual meeting UI on a second client device 102B-N, 104 in place of the respective second frame. Block 650 may include similar functionality to the functionality of block 240 of the method 200.

In one implementation, identifying a first frame of the video stream as a candidate for the background of the visual item (block 220 or block 620) occurs at a first time. At a second time occurring after the first time, the participant may desire to change the first frame that they are using as their frozen background (e.g., because the participant did not like the background of the visual item, or the participant has changed locations and would like to use their new background as the background of the visual item). Thus, at the second time, processing logic can identify a third frame of the video stream as the candidate for the background of the visual item. For each of one or more fourth frames of the video stream, processing logic can generate the composite image by superimposing the image of the participant depicted in a respective fourth frame of the one or more fourth frames of the video stream on the background of the third frame. This may include similar functionality to block 230 of the method 200 or block 640 of the method 600 but using the background of the newly identified third frame. In some implementations, the third frame occurs during a live phase of the virtual meeting 122.

Figure 7:
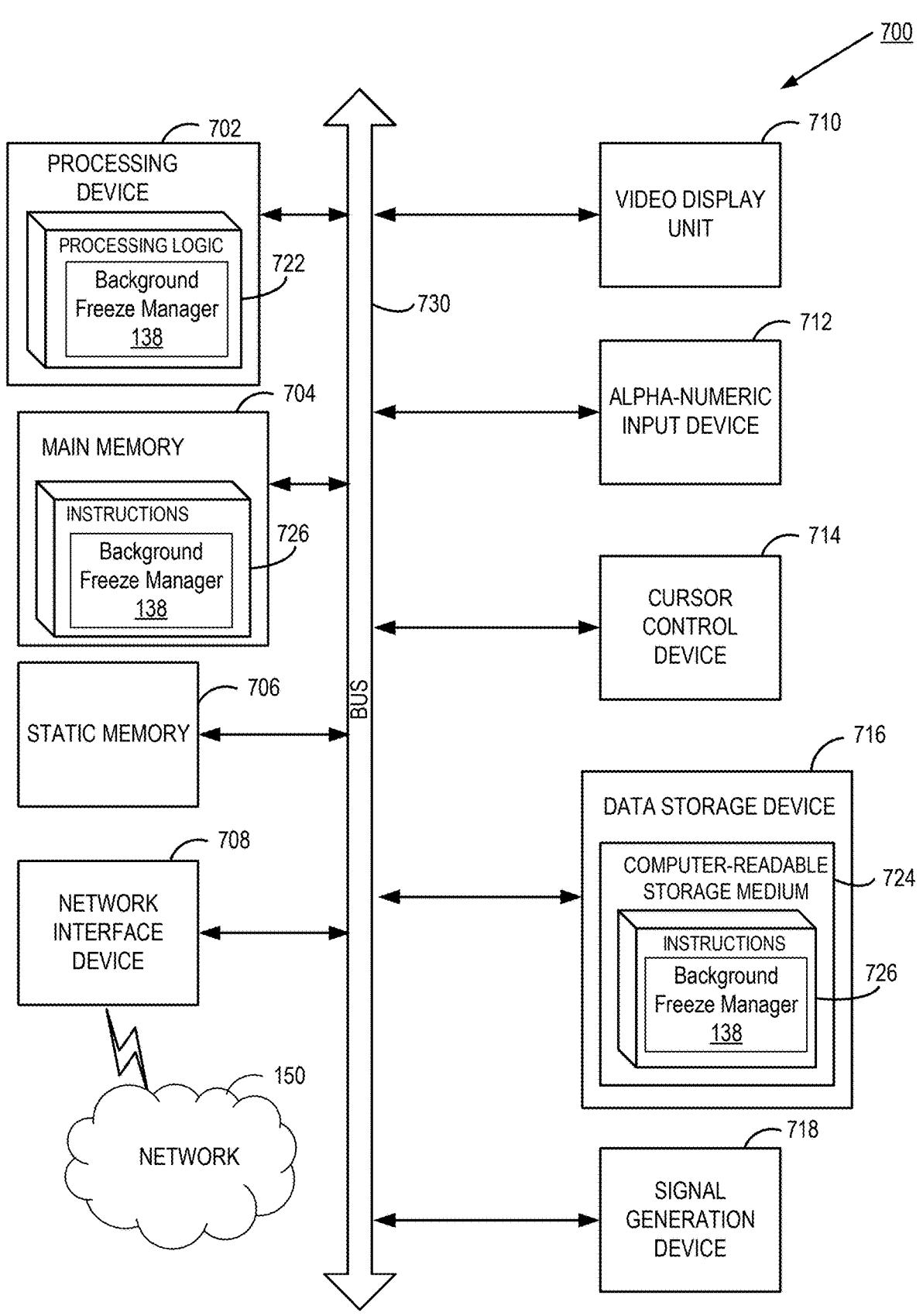
FIG. 7 is a block diagram illustrating an exemplary computer system, in accordance with some implementations of the present disclosure.

FIG. 7 is a block diagram illustrating an exemplary computer system, in accordance with implementations of the present disclosure. The computer system 700 can include a client device 102A-N, 104, the virtual meeting platform 120, or the server 130 in FIG. 1. The machine can operate in the capacity of a server or an endpoint machine, in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 716, which communicate with each other via a bus 730.

The processing device 702 represents one or more general-purpose processing devices such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute the processing logic 722 for performing the operations discussed herein (e.g., the operations of the background freeze manager 138).

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a non-transitory machine-readable storage medium 724 (sometimes referred to as a "computer-readable storage medium") on which is stored one or more sets of instructions 726 (e.g., the instructions to carry out one or more operations of the background freeze manager 138) embodying any one or more of the methodologies or functions described herein. The instructions can also reside, completely or at least partially, within the main memory 704 and/or within the processing device 702 during execution thereof by the computer system 700, the main memory 704 and the processing device 702 also constituting machine-readable storage media. The instructions can further be transmitted or received over the network 150 via the network interface device 708.

In one implementation, the instructions 726 include instructions for determining visual items for presentation in a user interface of a virtual meeting. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method, comprising:
determining that a background of a visual item corresponding to a video stream of a first client device of a participant of a virtual meeting is to be modified in a virtual meeting user interface (UI);
identifying a first frame of the video stream as a candidate for the background of the visual item, the first frame including an image of the participant in an area of the first frame;
modifying the first frame by removing the image of the participant from the area and filling the area to generate a background image; and
for each of one or more second frames of the video stream:
generating a composite image by superimposing an image of a participant depicted in a respective second frame of the one or more second frames of the video stream on the background image using a location and a size of the image of the participant with respect to the respective second frame; and
causing the composite image to be presented in the virtual meeting UI on a second client device in place of the respective second frame.

2. The method of claim 1,
further comprising using an artificial intelligence (AI) model to fill the area.

3. The method of claim 2, wherein the AI model comprises a diffusion model.

4. The method of claim 1, wherein:
identifying the first frame occurs at a preparation phase of the virtual meeting; and
generating the composite image occurs during a live phase of the virtual meeting.

5. The method of claim 1, further comprising performing a position detection operation on the image of the participant to identify:
a head outline of the image of the participant; and
a location of a facial feature of the image of the participant.

6. The method of claim 5, wherein superimposing the image of the participant on the background comprises superimposing the image of the participant in a center portion of the background based on the facial feature.

7. The method of claim 5, wherein superimposing the image of the participant on the background comprises superimposing a head of the image of the participant a predetermined distance from an edge of the background based on the head outline.

8. A system, comprising:
a memory; and
one or more processing devices, coupled to the memory, configured to perform operations comprising:
determining that a background of a visual item corresponding to a video stream of a first client device of a participant of a virtual meeting is to be modified in a virtual meeting user interface (UI);
identifying a first frame of the video stream as a candidate for the background of the visual item, the first frame including an image of the participant in an area of the first frame;
modifying the first frame by removing the image of the participant from the area and filling the area to generate a background image; and
for each of one or more second frames of the video stream:
generating a composite image by superimposing an image of a participant depicted in a respective second frame of the one or more second frames of the video stream on the background image using a location and a size of the image of the participant with respect to the respective second frame; and
causing the composite image to be presented in the virtual meeting UI on a second client device in place of the respective second frame.

9. The system of claim 8, wherein
the operations further comprise
causing an artificial intelligence (AI) model to fill the area.

10. The system of claim 9, wherein the AI model comprises a diffusion model.

11. The system of claim 8, wherein:
identifying the first frame occurs at a preparation phase of the virtual meeting; and generating the composite image occurs during a live phase of the virtual meeting.

12. The system of claim 8, wherein the operations further comprise performing a position detection operation on the image of the participant to identify:

a head outline of the image of the participant; and a location of a facial feature of the image of the participant.

13. The system of claim 12, wherein superimposing the image of the participant on the background depicted in the first frame comprises superimposing the image of the participant in a center portion of the background depicted in the first frame based on the facial feature.

14. The system of claim 12, wherein superimposing the image of the participant on the background depicted in the first frame comprises superimposing a head of the image of the participant a predetermined distance from an edge of the background depicted in the first frame based on the head outline.

15. A non-transitory computer-readable storage medium storing instructions which, when executed by one or more processors, perform operations, the operations comprising:

determining that a background of a visual item corresponding to a video stream of a first client device of a participant of a virtual meeting is to be modified in a virtual meeting user interface (UI);

identifying, at a first time, a first frame of the video stream as a candidate for the background of the visual item, wherein the first frame comprises an image of the participant in an area of the first frame;

modifying the first frame by removing the image of the participant from the area and using an artificial intelligence (AI) model to fill the area to generate a background image; and for each of one or more second frames of the video stream:

generating a composite image by superimposing an image of a participant depicted in a respective second frame of the one or more second frames of the video stream on the background image using a location and a size of the image of the participant with respect to the respective second frame; and causing the composite image to be presented in the virtual meeting UI on a second client device in place of the respective second frame.

16. The non-transitory computer-readable storage medium of claim 15, further comprising:

identifying, at a second time occurring after the first time, a third frame of the video stream as the candidate for the background of the visual item; and for each of one or more fourth frames of the video stream, generating the composite image by superimposing the image of the participant depicted in a respective fourth frame of the one or more fourth frames of the video stream on the background of the visual item.

17. The non-transitory computer-readable storage medium of claim 16, wherein identifying the third frame occurs during a live phase of the virtual meeting.

18. The non-transitory computer-readable storage medium of claim 15, wherein superimposing the image of the participant depicted in the respective second frame on the background depicted in the first frame comprises using a location and a size of the image of the participant with respect to the respective second frame.

19. The non-transitory computer-readable storage medium of claim 15, wherein:

identifying the first frame occurs at a preparation phase of the virtual meeting; and generating the composite image occurs during a live phase of the virtual meeting.

20. The non-transitory computer-readable storage medium of claim 15, further comprising performing a position detection operation on the image of the participant to identify:

a head outline of the image of the participant; and a location of a facial feature of the image of the participant.

* * * * *